J. ROWE.
MUD SHOE FOR AUTOMOBILES.
APPLICATION FILED OCT. 11, 1917.
1,312,924.
Patented Aug. 12, 1919.
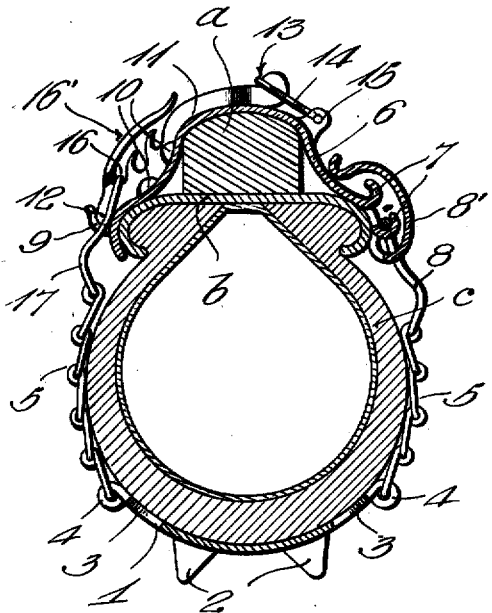
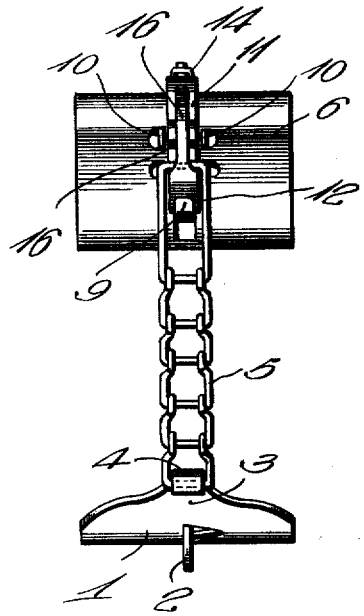
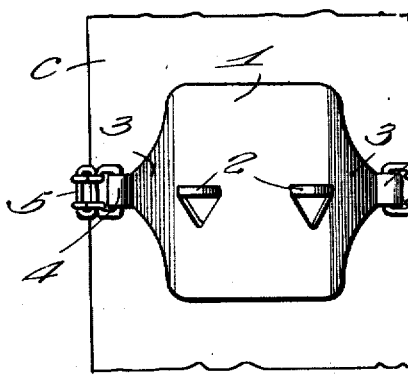
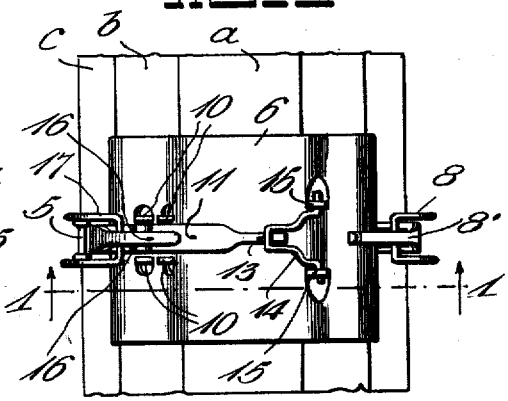
Witness
Inventor
John Rowe
By H. B. Willson &co
Attorneys

UNITED STATES PATENT OFFICE.

JOHN ROWE, OF CASEY, IOWA.

MUD-SHOE FOR AUTOMOBILES.

1,312,924.　　　　Specification of Letters Patent.　　Patented Aug. 12, 1919.

Application filed October 11, 1917.　Serial No. 195,973.

*To all whom it may concern:*

Be it known that I, JOHN ROWE, a citizen of the United States, residing at Casey, in the county of Guthrie and State of Iowa, have invented certain new and useful Improvements in Mud-Shoes for Automobiles; and I do declare the following to be a full, clear, and exact description of the invention, such as will enable others skilled in the art to which it appertains to make and use the same.

This invention relates generally to automobile accessories, and more particularly to certain new and useful improvements in mud shoes or tread members for automobiles.

The principal object of the invention is to provide a tread member which can be readily and easily applied to the wheel of an automobile while a portion of the same is embedded in a mud hole, and is provided with outwardly extending lugs that grip the earth when the wheel is rotated to aid in dislodging the latter from the mud hole.

Another object of the invention is to provide a device of this character which has new and improved means for tightening it around the felly and tire of the wheel.

A still further object of the invention is to generally improve upon devices of this class by the provision of an extremely simple, strong, durable and inexpensive construction, one which will be efficient and reliable in operation, and well adapted to the purpose for which it is designed.

With these and other objects in view, the invention consists of certain novel features of construction and the combination and arrangement of parts as will be hereinafter fully described and claimed.

In the accompanying drawings wherein the preferred form of the invention is shown and wherein similar reference characters are used to designate like parts throughout the several views:

Figure 1 is a cross sectional view of the felly and rim of an automobile, showing a device constructed in accordance with this invention applied thereto;

Fig. 2 is a side view of the device detached from the wheel;

Fig. 3 is a bottom plan view of the device, showing more particularly the mud shoe; and, Fig. 4 is a top-plan view of the device showing more particularly the felly of the wheel.

Referring more particularly to the drawings, a portion of an automobile wheel is conventionally shown, $a$ representing the felly of the wheel, $b$ the rim, and $c$ the tire. Fitted around these parts of the wheel as shown by Fig. 1 is a device constructed in accordance with this invention. This device consists of a mud shoe 1 which is preferably formed from a curved plate having one or more pointed lugs 2 stamped and turned outwardly therefrom. It is to be understood, however, that these lugs 2 may be formed upon the outer side of the plate in any suitable manner. The ends of the shoe are provided with wings 3 having eyes 4 formed at their free ends. To these eyes 4 are connected one of the ends of a pair of substantially flat chains 5 or other suitable connecting elements.

The reference numeral 6 designates a plate which is curved so as to fit rather snugly around the felly $a$ and the rim $b$. One end of the plate 6 is provided with a series of struck-up elements that are curved to form hooks 7 to receive the elongated link 8 fastened to one of the chains 5. This end of the plate is also provided with a yieldable retaining member 8' which extends backwardly over the hooks 7 and is spaced from the ends of these hooks to prevent the link 8 from becoming entirely disengaged from the plate 6 while permitting the link to be interchangeably engaged with the hooks 7. The other end of the plate 6 is provided with an outwardly extending lug or bearing 9 which is preferably hook shaped and struck up from the plate. The side of the plate 6 adjacent this lug 9 is provided with a guideway formed by stamping or striking up a number of spaced sets of ears 10.

A lever 11 is adapted to fit in this guideway, the inner side of said lever being shaped so as to conform to the shape of this side of the plate 6. One end of the lever 11 is provided with a round nose or pivotal element 12 which rests in a concaved seat formed by the hook shaped lug 9, and the other end of the lever is provided with a notch 13 which receives a bail or locking member 14 which is pivotally mounted in apertured ears 15 which are struck up from the top of the plate 6. The lever 11 is provided with a series of notches 16 and a keeper 16'. A link 17 is connected to one of the chains 5 and engages with notches 16 interchangeably to provide an adjusting means. The keeper or arm 16' prevents the link 17 from becoming accidentally disengaged from the lever 11.

The device is especially adapted for use as a tread member for enabling the wheels of an automobile to extricate themselves from a mud hole or snow drift. Assuming that the wheel is in a mud hole, and it will not move out of the same when it is revolved, the device is coupled around the tire, felly and rim of the wheel as shown in Fig. 1. It is to be understood that the lever 11 is disconnected from the plate 6 when the device is not in use. To apply it to a wheel, the plate 6 is first positioned around the felly and rim of the wheel, and the member 1 is then placed around the tread portion of the tire. The nose 12 of the lever 11 is then engaged with or fulcrumed on its seat on the lug 9, and the lever is swung inwardly upon the lug 9, while the nose 12 serves as a pivot. This movement obviously tightens the device around the tire, felly and rim of the wheel, the pull of the link 17 on the lever being such as to hold the lever in this position. However, the auxiliary locking member 14 is then swung into engagement with the notch 13 and the device will then be firmly locked upon the wheel. As the lug or concaved seat 9 would permit the lever 11 to shift laterally if not prevented by other means, the spaced sets of ears 10 serve to prevent such lateral movement of the lever; and the lugs would also be useful for this purpose if certain forms of pivoted and retaining connections other than the elements 9 and 14 were substituted for these elements. The member 14 is of spring metal so that its ends may be sprung toward each other to lengthen its intermediate portion and permit this portion to easily pass over the end of the lever and engage the notch. When the wheel is now revolved, the lugs 2 which extend outwardly from the tread plate will bite into the soil so that the wheel will run out of the mud hole.

From the foregoing description, taken in connection with the accompanying drawings, the construction, use and operation of the device will be readily understood without a more extended explanation.

As various changes in form, proportion and in the minor details of construction may be resorted to without departing from the spirit of the invention, it is to be understood that I do not wish to be limited to the construction herein shown and described other than as claimed.

I claim:—

1. In an attachment for embracing a tire and rim and felly of a wheel, a member extending across the inner surface of the felly and embracing and conforming to the opposite margins of the rim and being formed with spaced ears, anti-slipping means extending across the outer and lateral sides of the tire and having one end secured to said member, and a lever engageable with said anti-slipping means, said lever being normally substantially in pivoted engagement with said member and also being engaged with said anti-slipping means, and being swingable into and out of a position between said ears and retained by said ears in its operative position for holding the anti-slipping means on the tire substantially as described.

2. In an attachment for embracing a tire and rim and felly of a wheel, a member extending across the inner surface of the felly and embracing and conforming to the opposite margins of the rim and being formed with spaced ears, anti-slipping means extending across the outer and lateral sides of the tire and having one end secured to said member, a lever engageable with said anti-slipping means, said lever being normally substantially in pivotal engagement with said sheet metal member and also being engaged with said anti-slipping means and being swingable into and out of a position between said ears and retained by said ears in its operative position for holding the anti-slipping means on the tire, and a spring element pivotally mounted on said member and movable into engagement with said lever and being effective to retain said lever between said ears.

In testimony whereof I have hereunto set my hand in the presence of two subscribing witnesses.

JOHN ROWE.

Witnesses:
 HERMAN DIETRICH,
 ROY RAPER.